United States Patent Office 3,714,077
Patented Jan. 30, 1973

3,714,077
URETHANE FOAM CATALYST SYSTEM
David S. Cobbledick, Kent, and Arthur J. Norman, Tallmadge, Ohio, assignors to The General Tire & Rubber Company, Akron, Ohio
No Drawing. Filed Apr. 1, 1970, Ser. No. 24,817
Int. Cl. C08g 22/38, 41/04, 22/40
U.S. Cl. 260—2.5 BE
10 Claims

ABSTRACT OF THE DISCLOSURE

Heat discoloration of polyurethane foams containing halogen-containing polymers such as polyvinyl chloride is reduced or prevented by the use of catalyst systems consisting of combinations of polyol-soluble organic stannous compounds with polyol-soluble organic bismuth and/or antimony compounds, optionally, with certain sterically hindered tertiary amines such as N-methyl dicyclohexyl amine.

BACKGROUND OF THE INVENTION

Flexible polyurethane foams have been used for many years in the manufacture of mattresses for beds and cushions for sofas and the like. However, the soft low density foams, which are the most desirable, inherently have poor load bearing properties because of their low density. In an attempt to overcome this problem, polyvinyl chloride has been added to low density polyurethane foam formulations. When polyvinyl chloride is added to a conventional formulation including the usual tertiary amines, water and metal-containing catalysts and the formulation is run on production equipment as commercially used to form buns (loaves or slabs) having, for example, a cross section of about 30 x 76 inches and a length of about 40 feet or more, the foam discolors (dark brown or purple) so severely in the center of the cross section of the bun as to be virtually unsalable on a commercial scale.

The only external heat applied to the bun as it moves down the conveyor is that received when it passes through an oven at a speed of about 5 to 12 feet/min. and at a temperature of about 180° F. for the purpose of reducing or eliminating surface tack so that the outside paper can readily be removed without tearing large chunks from the foam.

At the end of the conveyor the buns are removed and stored for about 24 hours without any external heat being applied to permit the foam finally to cure or stabilize by itself. Then the foam is slit into mattress size units or into other sizes for further manufacturing operations. Even at this time the temperature of the center of the bun is well above room temperature.

The exothermic heat of reaction of the foam-forming ingredients during foaming reaches temperatures of from about 270 to 320° F. These temperatures are determined by a pyrometer probe at the end of the conveyor line and can be higher than shown considering that the mass of the pyrometer is greater than that of the surrounding foam.

On the other hand, in the manufacture of molded polyurethane foams as, for example bucket seats for automobiles, tractor seats, truck seats, furniture seats and the like which may have a thickness of from 1 to 6 inches, a width of up to about 20 inches and a length of up to about 6 feet, the production cycle time from introducing the foam ingredients into the mold up to removal of the molded foam from the mold can vary from about 25 to 35 minutes. Since small amounts of foaming ingredients are employed, it is necessary to heat the molds by passing them through an oven for most of the cycle to a temperature of from about 275 to 325° F. to cause the required blowing and crosslinking reactions to advance rapidly to reduce surface tack and to cure the foam sufficiently to enable removal of the foam from the mold without tearing. After the foam has been removed from the mold, the mold is subjected to a water spray to cool it. While in this case the exothermic heat generated by the foam is generally less than that observed when making foam buns, additional heat is applied to accelerate the reaction so that the total heat involved with respect to the molded foam approaches or is equal to that observed with respect to the buns. The applied heat is necessary if the speed of production is to be maintained and molded foams are to be produced economically. Here, again, discoloration (purpling) of the foam occurs when polyvinyl chloride is added to the foam mixture using conventional tertiary amines, water, metal-containing catalysts and the like.

A very recent development in the polyurethane foam art has been the use of sterically hindered tertiary amines as disclosed in United States patent application Ser. No. 819,087 filed Apr. 24, 1969 by Edwin M. Maxey and John T. Harrington. The use of these amines as catalysts in place of the simple tertiary amines previously employed has resulted in the reduction or elimination of heat discoloration in polyurethane foams containing halogenated polymers such as polyvinyl chloride, but further reduction in heat discoloration as well as greater reliability in such reduction is highly desirable.

Another recent development in the polyurethane foam art has been the use of a particular combination of zinc oxide and antimony oxide as a flame retardant in foams containing halogenated polymers such as polyvinyl chloride as disclosed in United States patent application Ser. No. 824,285 filed May 13, 1969 by John T. Harrington, now U.S. Pat. No. 3,574,149. These flame retardant systems are so good and so desirable that any solution to the heat discoloration problem should be compatible with these systems.

Accordingly, it is a primary object of the invention to avoid the difficulties alluded to above and to provide flexible, low density polyurethane foams which contain halogen-containing polymers, which have the desired load-bearing characteristics and which exhibit resistance to or freedom from discoloration after foaming and to provide a method for making the same. It is a further object of this invention to provide such systems which can contain metal oxide fire retardants without affecting the desired properties.

SUMMARY OF THE INVENTION

According to the present invention, it has now been discovered that polyurethane foams containing halogen-containing polymers can be rendered highly resistant to heat discoloration by the use as catalysts of a combination of a polyol-soluble organic stannous compound and a polyol-soluble organic bismuth and/or antimony compound. It has been discovered further that the resistance to heat discoloration is not adversely affected by the presence of sterically-hindered tertiary amines or antimony and/or zinc oxides.

DESCRIPTION OF THE PREFERRED EMBODIMENTS

The polyurethane foaming composition or formulation must contain a combination of one or more polyol-soluble organic stannous compounds with either one or more polyol-soluble organic bismuth compounds or one or more polyol-soluble organic antimony compounds or a mixture of such bismuth and antimony compounds.

The preferred stannous compounds are the stannous salts of aliphatic carboxylic acids having from 2 to 18 carbon atoms such as stannous diacetate, stannous bis-2-ethylhexoate, stannous dineodecanoate and stannous dioleate, but the stannous salts of aromatic and cycloaliphatic carboxylic acids can also be employed as well as any stable stannous alkoxides.

The polyol-soluble organic stannous compounds are employed in a total amount ranging from about 0.05 to 2 parts by weight, preferably from about 0.1 to 0.9 part by weight, per 100 parts by weight of the polyol as hereinafter described.

While any polyol-soluble organic antimony compounds can be used in this invention, the compounds of trivalent antimony are preferred. Such compounds include, for example, the antimonous salts of carboxylic acids such as antimonous triacetates, antimonous tri-2-ethylhexoate, antimonous trinonanoate, antimonous trineodecanoate, antimonous trioleate, antimonous tristetrachlorobenzoate, antimonous trinaphthenate, antimonous tris-cyclohexylcarboxylate and the like as further illustrated in U.S. Pats. Nos. 3,245,958 and 3,484,410. Also operative is the antimony glycoloxide as described in British Pat. No. 805,534.

Similarly, while any polyol-soluble organic bismuth compound can be used in this invention, the compounds of trivalent bismuth are preferred. Such compounds include, for example, the bismuthous salts of carboxylic acids such as bismuthous triacetate, bismuthous trineodecanoate, bismuthous tribenzoate, bismuthous trinaphthenate, bismuthous tris-cyclohexylcarboxylate, bismuthous tripropionate, bismuthous tripentanoate, bismuthous tripentanoate, bismuthous tri-2-ethylhexoate and bismuthous trioleate.

Also operative in this invention are the alkoxides of trivalent antimony and bismuth, particularly those of the formula:

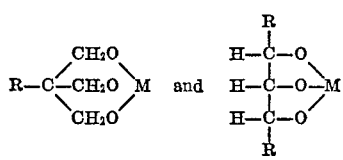

in which each M can be antimony or bismuth and each R is a non-intaerfering substituent selected from the group consisting of hydrogen, halogen, alkyl, substituted alkyl, aryl, substituted aryl and mixtures the thereof. The alkyl or aryl groups may contain, for example, 1–20 carbon atoms and preferably 1–8 carbon atoms when the group is alkyl. The preferred substituted alkyl and aryl groups are the hydroxyalkyl and hydroxyaryl groups. These compounds and their preparation are described in U.S. Pats. Nos. 3,109,853 and 3,407,153.

The polyol-soluble organic antimony and bismuth compounds in this invention are employed in a total amount ranging from about 0.01 to 1 part by weight, preferably about 0.03 to about 0.5 parts by weight, per 100 parts by weight of the polyol as hereinafter described. These organic antimony and bismuth compounds are preferably used in an amount less than the amount of organic stannous compounds in the system. The antimony compounds are significantly more active than the bismuth compounds and can therefore be used in substantially smaller quantities than the corresponding bismuth compounds to achieve the same activity and properties.

Polyols used in making the polyurethanes of the present invention are primary and secondary hydroxy terminated polyoxyalkylene ethers and polyesters having from 2 to 4 hydroxyl groups and a molecular weight of from about 1,000 to 10,000. They are liquids or are capable of being liquefied or melted for handling in the polyurethane foaming apparatus or machine.

Examples of polyoxyalkylene polyols include linear and branched polyethers having a plurality of ether linkages and containing at least two hydroxyl groups and being substantially free from functional groups other than hydroxyl groups. Among the polyoxyalkylene polyols which are useful in the practice of this invention are the polyethylene glycols, the polypropylene glycols, and polybutylene ether glycols. Polymers and copolymers of polyoxyalkylene polyols are also adaptable in the process of this invention as well as the block copolymers of ethylene oxide and propylene oxide. Among the copolymers of polyoxyalkylene polyols that deserve some special mention are the ethylene oxide, propylene oxide and butylene oxide adducts of ethylene glycol, propylene glycol, diethylene glycol, dipropylene glycol, triethylene glycol, 2-ethylhexanediol-1,3, glycerol, 1,2,6-hexanetriol trimethylolpropane, trimethylolethane, tris(hydroxyphenyl)propane, triethanolamine, triisopropanolamine, ethylenediamine, and ethanolamine. Linear and branched heteric copolyethers of ethylene oxide and propylene oxide are also useful in making the foamed products of this invention with the preferred ones being those end blocked with ethylene oxide to provide primary hydroxyl groups in the polymer and having molecular weights of from about 2000 to 5000.

Further useful types of polyetherpolyols are block copolymers prepared from propylene oxide and ethylene oxide. These polyethers can be characterized by reference to the following general formulae:

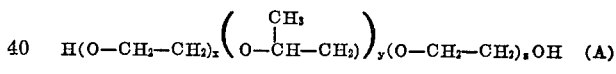

and

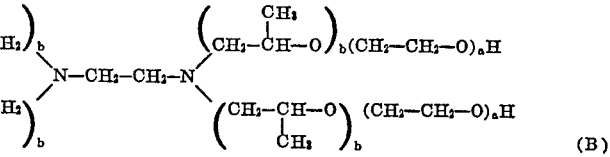

where in Formula A the total of subscripts, x, y and z represent positive integers in the range of from 22 to 70 and the total of subscripts a and b in Formula B represent positive integers in the range of from 20 to 100.

Polyethers having a branched chain network are also useful. Such branched chain polyethers are readily prepared from alkylene oxides of the type above described and initiators having a functionality greater than two. Branched polyethers have the advantage of making possible cross linking without the interaction of urea or urethane groups with the isocyanate groups. This has the advantage of making a larger proportion of the isocyanate used available for the evolution of carbon dioxide and of reducing the overall amount of isocyanate that is required in the preparation of the foamed polymer. Mixtures of polyether polyols can be used.

Polyester polyols used in the practice of the present invention are made by the reaction of a major amount of a glycol and a minor amount of a dicarboxylic acid. When branching is desired to get the required network in the urethane foam, a minor amount of a triol is employed. The total OH functionality is greater than the COOH functionality so that OH terminated polyesters are produced. Representative polyesters include polyesters prepared from ethylene glycol and adipic acid; propylene glycol and adipic acid; ethylene glycol, propylene glycol and adipic acid; ethylene glycol, propylene glycol-1,2 and azelaic acid; ethylene glycol, propylene glycol-1,2 and sebacic acid; ethylene glycol, propylene glycol-1,2 and dilinoleic acid; ethylene glycol, glycerine and adipic acid, ethylene glycol, glycerine and adipic acid; ethylene glycol, butylene glycol-1,4 and adipic acid; propylene glycol-1,3, trimethylol propane and adipic acid; ethylene glycol, pentanediol-1,4 and adipic acid; ethylene glycol, glycerine monoisopropyl ether and adipic acid; propylene glycol-1,2, 1,2,6-hexane triol and adipic acid; ethylene glycol, propylene glycol-1,2, maleic acid and adipic acid; ethylene glycol, dipropylene glycol and adipic acid; butylene glycol, propylene glycol-1,2 and adipic acid; ethylene glycol, butylene glycol-1,4 and sebacic acid; propylene glycol, diethylene glycol and adipic acid; ethylene glycol, propylene glycol-1,2 and adipic acid; diethylene glycol, propylene glycol-1,2 and azelaic acid, and the like.

These polyesters are reaction products of polyols, such as the aforementioned aliphatic polyols and in particular the class of aliphatic polyols containing from two to ten carbon atoms, with polycarboxylic acids having from two to thirty-six carbon atoms, e.g., oxalic acid, succinic acid, maleic acid, adipic acid, sebacic acid, isosebacic acids, phthalic acids, and dimer acids such as those obtained by coupling two molecules of linoleic acid. Mixtures of polyester polyols can be used.

Likewise, there can be used as polyols grafts of ethylenically unsaturated monomers such as acrylonitrile, methacrylonitrile, vinyl acetate, methyl acrylate and the like on the polyols or polyesters and having the functionality and molecular weight as shown above. Such graft polyols and methods for making the same are shown in the U.S. patents to Stamberger, Nos. 3,304,273 and 3,383,351 and in the U.S. patent to Von Bonin, No. 3,294,711.

When desired, cross-linking materials having from 2 to 8 hydroxyl groups can be included in the foam formulations to increase cross-link density and so forth. They have molecular weights of from about 60 to 600. Only small amounts of such materials are generally needed (about 0.3 to 10 mols per 100 mols of polyol). Examples of such crosslinking agents are glycol, diethylene glycol, propylene glycol, butane diol-1,4, dipropylene glycol, glycerol, trimethylolpropane, butanetriols, hexanetriols, trimethylolphenol, tris(hydroxyphenyl) propane, tris(hydroxyxylyl) propane, various tetrols, such as erythritol and pentaerythritol; pentols; hexols, such as dipentaerythritol and sorbitol, as well as alkyl glucosides, carbohydrates, polyhydroxy fatty acid esters such as castor oil, and polyoxyalkylated derivatives or polyfunctional compounds having three or more reactive hydrogen atoms, such as, for example, the reaction product of trimethylolpropane, glycerol, 1,2,6-hexane triol, sorbitol and other polyols with ethylene oxide, propylene oxide or other alkylene epoxide or copolymers thereof, e.g., copolymers of ethylene and propylene oxides. Grafted crosslinkers can be prepared by the processes of the aforementioned Stamberger and Von Bonin U.S. patents. Mixtures of crosslinkers can be used. The crosslinkers, polyethers, polyesters and graft polyols of the same as well as the polyisocyanates disclosed herein, i.e., the polymer forming materials, should be free of amino groups or, if they are present, they should be sterically hindered or shielded.

Any organic di- or tri-isocyanate can be used in the practice of the present invention. Diisocyanates are preferred, particularly when there is any considerable amount of branching in the polyol or crosslinking, to avoid the formation of rigid or semirigid foams. Examples of suitable organic polyisocyanates to use are ethylene diisocyanate, trimethylene diisocyanate, tetramethylene diisocyanate, pentamethylene diisocyanate, hexamethylene diisocyanate, propylene-1,2-diisocyanate, butylene-1,2-diisocyanate, butylene-1,3-diisocyanate, butylene-2,3-diisocyanate, alkylidene diisocyanates such as ethylidine diisocyanate and butylidine diisocyanate; cycloalkylene diisocyanates such as cyclopentylene-1,3-diisocyanate, cyclohexylene-1,2-diisocyanate, cyclohexylene-1,3-diisocyanate, and cyclohexylene-1,4-diisocyanate; cycloalkylidene diisocyanates such as cyclopentylidene diisocyanate and cyclohexylidene diisocyanate; aromatic diisocyanates such as m-phenylene diisocyanate, p-phenylene diisocyanate, polymethylene polyphenylisocyanate, 2,4-tolylene diisocyanate, 2,6-tolylene diisocyanate, bitolylene diisocyanate, naphthalene-1,4-diisocyanate, and diphenylene-4,4'-diisocyanate; aliphatic-aromatic diisocyanates such as xylylene-1,4-diisocyanate, xylylene-1,3-diisocyanate, bis(4-isocyanato-phenyl) methane, bis(3-methyl-4-isocyanatophenyl)methane, and 4,4'-diphenylpropane diisocyanate, durylene diisocyanate, 4,4',4''-tris(isocyanatophenyl)methane, 3,10-diisocyanate tricyclo [5.2.1.0$^{26}$] decane, bis-(2-isocyanatoethyl)carbonate, and naphthalene triisocyanate and the like. Mixtures of polyisocyanates can be used.

The amount of polyisocyanate employed ranges from about 0.70 to 1.35 total mols of NCO (in the polyisocyanates) per total mol of active hydrogen (as determined by the Zerewitinoff method, J.A.C.S., vol. 49, p. 3181 (1927)) in the polyols, crosslinkers, water, halogen-containing resins (such as partially hydrolyzed vinyl chloride-vinyl acetate copolymers) and any other active hydrogen containing material in the polyurethane foam formulation.

Water is used as a blowing agent and should be substantially or essentially pure, that is, it should be free of impurities such as ions, sols and the like of mineral, vegetable, or synthetic origin and the like which would adversely affect the foaming action of the properties of the resultant polyurethane foam. Deionized, distilled or otherwise purified water should be employed.

The water is employed in amounts of from about 1.5 to 5 parts by weight per 100 parts by weight of the polyol.

The halogen-containing solid polymers employed herein include polymers, usually resinous in character, of vinyl chloride, vinyl bromide, vinyl fluoride and vinylidene chloride and mixtures of these monomers as well as copolymers of a predominating molar amount of one or more of these monomers and a minor amount of vinyl acetate, acrylonitrile, methacrylonitrile, dimethyl or diethyl maleate or fumarate, methyl acrylate, methyl methacrylate, ethyl ethacrylate, vinyl stearate and the like and mixtures thereof. Still other halogen-containing resins can be used such as hydrolyzed or partially hydrolyzed copolymers of a major amount of the vinyl halide and a minor amount of vinyl acetate. Moreover, other resins can be used such as chlorinated rubber, chlorinated polyethylene, chlorinated polyvinyl chloride, polytetrafluoroethylene and the like. Mixtures of the halogen-containing polymeric resins can be used.

These halogen-containing resins should be finely divided (powders from about 0.0001 to 2 mm.) and have an intrinsic viscosity of from about 0.5 to 2.5, preferably from about 0.5 to 1.5. The halogen-containing resins can be made by bulk, solvent, emulsion, or suspension polymerization processes. It is preferred to use halogen-containing resins made by the emulsion polymerization process. Of these halogen-containing resins it also is preferred to employ polyvinyl chloride, especially emulsion polymerized polyvinyl chloride (plastisol grade).

The halogen-containing resins are used in an amount effective to obtain the desired load bearing characteristics; generally, they are used in an amount of from about 2 to 100 parts by weight, preferably from about 5 to 30 parts by weight, per 100 parts by weight of the polyol.

If lower density and softer foams are desired there additionally can be added to the polyurethane foam formulation separately or in admixture with one of the other components, such as the polyol or polyisocyanate, up to about 25 parts by weight of a fluorocarbon blowing agent per 100 parts by weight of the polyol. Examples of such blowing agents are those fluorine-substituted aliphatic hydrocarbons which have boiling points between about −40° C. and +170° C. and which vaporize at or below the temperature of the foaming mass. The blowing agents chlorodifluoromethane, dichloromonofluoromethane, bromotrifluoromethane, chlorodifluoromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2,-trifluoroethane, 1,1,1-trichloro-2,2,2-trifluoroethane, 2-chloro-nonafluorobutane, hexafluorocyclobutene, and octafluorocyclobutane. Still other easily vaporizable fluorocarbons can be used. Mixtures of the fluorocarbons can be used. Still other blowing agents can be used in full or partial replacement of the fluorocarbons such as propane, butane, pentane, pentene, hexane and so forth and mixtures thereof, particularly where precautions are taken to prevent explosions or where removal of the gases is provided. See U.S. Pats. Nos. 3,072,582 and 3,391,093.

The polyurethane foaming composition or formulation can also contain one or more sterically hindered tertiary amines selected from the group consisting of

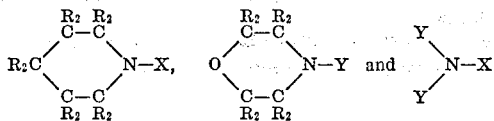

where X is selected from the group consisting of alkly or alkyenyl radicals having from 1 to 18 carbon atoms, alkylene and alkyl substituted and unsubstituted cycloaliphatic hydrocarbon radicals having a ring of from 4 to 8 carbon atoms and up to a total of 16 carbon atoms, alkylene and alkyl substituted and unsubstituted aromatic hydrocarbon radicals containing one benzene ring and from 6 to 16 carbon atoms;

where Y is selected from the group consisting of alkyl and alkylene substituted and unsubstituted cycloaliphatic hydrocarbon radicals having a ring of from 4 to 8 carbon atoms and containing up to a total of 16 carbon atoms and alkyl and alkylene substiutted and unsubstituted aromatic hydrocarbon radicals containing one benzene ring and from 6 to 16 carbon atoms; and where R is hydrogen or an alkyl radical of from 1 to 4 carbon atoms, the maximum number of said alkyl radicals being 4.

Examples of such sterically hindered tertiary amines are

N-hexyl dicyclohexyl amine;
methyl dicyclohexyl amine;
butyl dicyclohexylamine;
octadecyl dicyclohexylamine;
ethyl cyclohexyl phenylamine;
dicyclohexyl phenyl amine;
triphenyl amine;
N,N-dibenzyl aniline;
dibenzyl cyclohexylamine;
tricyclohexylamine;
tricyclooctyl amine;
tri (1-cyclohexyl-ethyl-2) amine;
di-(tert-butyl-cyclohexyl)methyl amine;
(2-ethyl-1-hexenyl)diphenyl amine;
1(2-ethyl-1-hexenyl)piperidine;
1(tolyl)piperidine;
1(cyclobutyl)-3-butyl piperidine;
1(cycloheptyl)-2,3,6-trimethyl piperidine;
1(cyclohexyl)-2,2,6,6-tetramethyl piperidine;
N-phenyl dicyclohexyl amine;
N-p-tolyl dicyclohexyl amine;
N-benzyl dicyclohexyl amine;
N-methyl diphenyl amine;
4(cyclopentyl) morpholine;
4(cyclohexyl)-2,6-dimethyl morpholine;
4(benzyl) morpholine;
4(m-cumenyl)morpholine and the like and mixtures thereof. The tertiary amines are well known and can be made by known processes; for example, they can be prepared by methods shown by Fieser and Fieser, "Organic Chemistry," D. C. Heath and Company, Boston, 1944.

These hindered tertiary amines can be used in amounts up to about 3 parts by weight based on 100 parts by weight of the polyol, but it is preferred to use no more than about 0.9 part by weight of the amine per 100 parts by weight of the polyether polyol.

The polyurethane foaming composition or formulation can also contain per 100 parts by weight of the organic polyol from about 0.5 to 15 parts, preferably about 1 to 10 parts, of zinc oxide (French Process) and from about 1 to 20 parts, preferably about 3 to 15 parts, of antimony oxide, which will render the ultimate foam not only flame resistant but also self extinguishing.

Surfactants or emulsifiers are necessary to provide the desired cell formation and growth. Polysiloxane-polyoxyalkylene block copolymers are preferred. Polysiloxane-polyoxyalkylene block copolymers are described in U.S. Pats. 2,834,748 and 2,917,480. Another useful class of emulsifiers are the "nonhydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group and (b) an alkali metal salt of a polyoxyalkylene polymer to a temperature sufficient to cause the polysiloxane polymer and the salt to react to form the block copolymer. Although the use of an emulsifier is desirable to influence the type of foam structure that is formed, the foam products of the invention can be prepared without emulsifiers. Still other polysiloxane-polyoxyalkylene copolymers known to the art may be employed as well as silicones, turkey red oil and so forth. The surfactant is used in an amount of from about 0.3 to 2.5 parts by weight per 100 parts by weight of the polyether or ester polyol.

Other well known constituents can be added to the polyurethane foam recipe such as barium and cadmium salts of carboxylic acids, clay, talc, $TiO_2$, silica and hydrated silica, $CaCO_3$, metal chromates, barytes, phthalocyanine green or blue pigments, red iron oxide, conventional stabilizers, carbon black, dyes, toners, epoxidized soy bean oil (Paraplex G–62), epoxides (Epon 838), tricresyl phosphate, zinc oxide, antimony oxide, antioxidants, fungicides, bacteriostats and the like. These constituents can be added in various amounts to the foaming ingredients to achieve the desired properties in the resultant flexibile, low density foams.

The flexible, cellular urethane- vinyl chloride polymeric foams of the present invention can be used as cushions, mattresses, pillows, cushioning material for furniture and automobiles, rug underlay and especially as interior automobile door panels, head rests, and so forth.

The preparation of the polyurethane foams of the present invention can be formed by a process known in the art as the "one-shot" process or by a two-step process involving, first, the preparation of a "prepolymer," the well-known "semi-prepolymer" or "quasiprepolymer" technique. There all or a portion of the polyol is reacted with all of the organic polyisocyanate, providing a reaction product which contains a high percentage of free isocyanate groups and which is reacted with the remaining portion of the hydroxyl-terminated polyol or a crosslinker, together with water, catalysts, and the halogen-containing polymer to form a rubbery, cellular, elastic product.

No matter which particular technique is used, the halogen-containing polymer or resin may not only be dispersed with the polyol alone, but alternatively with the organic polyisocyanate alone. Still another method within the purview of the present invention involves dispersing the halogen-containing polymer with a combination of the polyol and the organic polyisocyanate. In any case, it is advantageous to disperse thoroughly the halogen-containing polymer into whatever particular initial composition is used.

The following examples are merely illustrative and are not intended to limit the invention, the scope of which is delineated in the claims.

Example 1

To separate batches of 100 grams of polyoxypropylene triol having a molecular weight of 3000 were added with stirring 1.0 gram of a surfactant comprising a silicone block copolymer (Union Carbide L544), 4.0 grams of deionized water, 0.3 gram of stannous octoate and the indicated amounts of bismuth trineodecanoate, antimony tri-neodecanoate, a mixture of salts of trivalent antimony and oleic and linoleic acids (employed as a 50% by weight solution in di-2-ethylhexyl phthalate) and N-methyl dicyclohexyl amine. The compositions were stirred until uniform. Then 15 grams of a finely-divided polyvinyl chloride resin produced by emulsion polymerization and having an intrinsic viscosity of 1.28 (Geon 121) were added to each dispersion together with a combination of 7 grams of finely-divided antimony trioxide and 3 grams of finely-divided zinc oxide with additional stirring until uniform dispersions were obtained.

To each of these dispersions was added in the amount shown an 80:20 blend of the 2,4 and 2,6 isomers of toluene diisocyanate with additional stirring for 10 seconds. The resulting admixtures were poured into gallon containers, and three minutes were allowed for the resulting foaming reactions to take place. The resulting foams were placed in an oven regulated to a temperature of 250° F. and cured at this temperature for 10 minutes producing rubbery, resilient, load resistant cellular products which were seen to have a uniform light yellow color.

ly encountered during the commercial production of buns. These specimens exhibited little or no discoloration after heat-aging while specimens cut from foam samples prepared in an identical manner except for the use of the usual tertiary amine catalysts in combination with stannous octoate exhibited a deep purple color similar to that encountered during the commercial production of buns containing polyvinyl chloride in the foam formulation.

Variations in the above formulations A to M in the amounts of the various ingredients within the defined ranges create the same variation in physical properties in the foams of this invention as similar variations in similar foam formulatons of the prior art. The presence or absence of the antimony oxide-zinc oxide flame retardant combination has no significant effect on the heat-aging characteristics of the formulations of this invention.

We claim:

1. A method of making a flexible, low density polyurethane foam by the reaction of (A) polyols each having a molecular weight of from about 1000 to 10,000 and being selected from the group consisting of polyether polyols and polyester polyols, (B) organic polyisocyanates, the mole ratio of —NCO groups to active hydrogen groups being from about 0.70:1 to 1.35:1 using the one-shot or prepolymer process, and (C) a blowing agent comprising water in admixture with (D) a surfactant, (E) a finely-divided, solid halogen-containing polymeric resin, (F) a metal-containing catalyst consisting essentially of a mixture of from about 0.05 to 2 parts by weight per 100 parts by weight of component (A) of polyol-soluble organic stannous salts of carboxylic acids and from about 0.01 to 1 part by weight per 100 parts by weight of component (A) of polyol-soluble organic metal compounds, the metal in said organic metal compounds being selected from the group consisting of antimony and bismuth and said metal compounds being selected from the group consisting of metal alkoxides and metal salts of carboxylic acids, and (G) from about 0.05 to 3.2 parts by weight per 100 parts by weight of com-

| Material (amount in grams) | Foam | | | | | | | | | | | | |
|---|---|---|---|---|---|---|---|---|---|---|---|---|---|
| | A | B | C | D | E | F | G | H | I | J | K | L | M |
| 3,000 M.W. triol | 100.0 | 100.0 | 100.0 | 100.0 | 100.0 | 100.0 | 100.0 | 100.0 | 100.0 | 100.0 | 100.0 | 100.0 | 100.0 |
| Surfactant | 1.0 | 1.0 | 1.0 | 1.0 | 1.0 | 1.0 | 1.0 | 1.0 | 1.0 | 1.0 | 1.0 | 1.0 | 1.0 |
| Water (deionized) | 4.0 | 4.0 | 4.0 | 4.0 | 4.0 | 4.0 | 4.0 | 4.0 | 4.0 | 4.0 | 4.0 | 4.0 | 4.0 |
| Stannous octoate | 0.3 | 0.3 | 0.15 | 0.15 | 0.15 | 0.15 | 0.15 | 0.15 | 0.15 | 0.15 | 0.15 | 0.15 | 0.15 |
| Bismuth tri-neodecanoate | 0.1 | 0.1 | | | 0.1 | 0.1 | 0.1 | | | | | | |
| Antimony tri-neodecanoate | | | | | 0.1 | | | 0.1 | 0.1 | 0.05 | | | |
| Mixture of antimony salts | | | | | | | | | | | 0.1 | 0.1 | 0.1 |
| N-methyl dicyclohexyl amine | | 0.2 | 0.2 | 0.2 | | 0.5 | 0.2 | | | | | 0.05 | 0.2 |
| Polyvinyl chloride resin | 15.0 | 15.0 | 15.0 | 15.0 | 15.0 | 15.0 | 15.0 | 15.0 | 15.0 | 15.0 | 15.0 | 15.0 | 15.0 |
| Antimony oxide | 7.0 | 7.0 | 7.0 | 7.0 | 7.0 | 7.0 | 7.0 | 7.0 | 7.0 | 7.0 | 7.0 | 7.0 | 7.0 |
| Zinc oxide | 3.0 | 3.0 | 3.0 | 3.0 | 3.0 | 3.0 | 3.0 | 3.0 | 3.0 | 3.0 | 3.0 | 3.0 | 3.0 |
| Toluene diisocyanate (80:20) | 52.5 | 52.5 | 52.5 | 52.5 | 52.2 | 52.2 | 52.2 | 52.2 | 52.2 | 52.2 | 52.2 | 52.2 | 52.2 |

In order to test the foregoing foams they were removed from the oven, cooled to room temperature and cut into test specimens having dimensions of 6 inches by 2 inches by 0.5 inch. Some specimens were tested immediately for tensile strength, percentage elongation at break and tear strength. Corresponding specimens were similarly tested after being heat-aged for 22 hours at 284° F. The measured physical properties were as follows:

| Property | Foam | | | | | | | | |
|---|---|---|---|---|---|---|---|---|---|
| | E | F | G | H | I | J | K | L | M |
| Initial: | | | | | | | | | |
| Tensile (p.s.i.) | 15.6 | 15.5 | 13.6 | 19.3 | 19.6 | 21.2 | 14.4 | 13.4 | 12.4 |
| Elongation (percent) | 130 | 133 | 117 | 176 | 182 | 157 | 137 | 123 | 123 |
| Tear (p.l.i.) | 2.18 | 1.83 | 1.92 | 1.78 | 1.78 | 1.85 | 2.0 | 2.17 | 1.70 |
| Aged: | | | | | | | | | |
| Tensile (p.s.i.) | 21.7 | 21.5 | 18.7 | 25.8 | 25.5 | 30.2 | 18.6 | 18.2 | 16.6 |
| Elongation (percent) | 163 | 163 | 160 | 206 | 188 | 194 | 160 | 157 | 160 |
| Tear (p.l.i.) | 2.43 | 2.67 | 2.67 | 2.73 | 2.43 | 2.27 | 2.93 | 2.95 | 2.88 |

Specimens of all the foams were also heat-aged for 3 hours at 300° F., 3 hours at 250° F. and 18 hours at 180° F. in order to simulate the exotherm curves normalponent (A) of at least one sterically hindered tertiary amine selected from the group consisting of

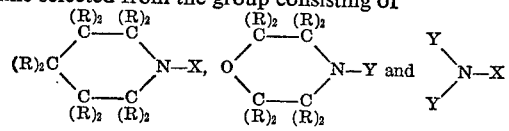

where X is selected from the class consisting of alkyl or alkenyl groups having from 1 to 18 carbon atoms; unsubstituted cycloaliphatic hydrocarbon groups, alkyl substituted cycloaliphatic hydrocarbon groups and cycloaliphatic alkylene hydrocarbon groups, said cycloaliphatic groups having a ring of from 4 to 8 carbon atoms and up to a total of 16 carbon atoms; and unsubstituted aromatic hydrocarbon groups, alkyl substituted aromatic hydrocarbon groups and aromatic alkylene hydrocarbon groups, said aromatic groups containing one benzene ring and from 6 to 16 carbon atoms;

where is selected from the class consisting of unsubstituted cycloaliphatic hydrocarbon groups, alkyl substituted cycloaliphatic hydrocarbon groups and cycloaliphatic alkylene hydrocarbon groups, said cycloaliphatic groups having a ring of from 4 to 8 carbon atoms and up to a total of 16 carbon atoms; and unsubstituted aromatic hydrocarbon groups, alkyl substituted aromatic hydrocarbon groups and aromatic alkylene hydrocarbon groups, said aromatic groups containing one benzene ring and from 6 to 16 carbon atoms; and where R is hydrogen or an alkyl group of from 1 to 4 carbon atoms, the maximum number of said alkyl groups being 4.

2. A method according to claim 1 in which the polyol-soluble organic stannous salts of carboxylic acids consist essentially of stannous salts of aliphatic carboxylic acids having from 2 to 18 carbon atoms and the metals in the polyol-soluble organic metal compounds are trivalent.

3. The method according to claim 1 in which the resin (E) has an intrinsic viscosity of from about 0.25 to 2.5, is selected from the group consisting of polyvinyl chloride, a copolymer of a major amount of vinyl chloride and a minor amount of vinyl acetate, a partially hydrolyzed copolymer of a major amount of vinyl chloride and a minor amount of vinyl acetate, and chlorinated polyethylene and in present in an amount of from about 5 to 40 parts by weight per 100 parts by weight of the polyol.

4. The method according to claim 2 in which the resin is polyvinylchloride made by emulsion polymerization.

5. The method according to claim 1 in which the polyol is a polyalkylene ether polyol and said tertiary amine is present in an amount of from about 0.05 to 0.9 part by weight per 10 parts by weight of said polyol.

6. The method according to claim 5 in which the tertiary amine is selected from the group consisting of N-methyl dicyclohexyl amine, N-cyclohexyl morpholine, tricyclohexyl amine, and 1(2-ethyl-1-hexenyl)piperidine.

7. The method according to claim 1 in which there is also present in the reaction system (H) a combination of French Process zinc oxide in an amount of from about 0.5 to 15 parts by weight per 100 parts by weight of said polyol and antimony oxide in an amount of from about 1 to 20 parts by weight per 100 parts by weight of said polyol.

8. The method according to claim 7 in which the zinc oxide is used in an amount of from about 1 to 10 parts by weight per 100 parts of the polyol and the antimony oxide is used in an amount of from about 3 to 15 parts by weight per 100 parts of the polyol, the amount of zinc oxide being essentially no more than the amount of antimony oxide.

9. The method according to claim 8 in which the resin E is polyvinyl chloride made by emulsion polymerization.

10. A low density, flexible or semiflexible polyurethane foam selected from the group consisting of polyesterurethane and polyesterurethane foam, the ether and ester moieties of said foams being derived from polyols having a molecular weight of from about 1,000 to 10,000, containing from about 2 to 100 parts by weight per 100 parts by weight of the polyols of a finely-divided solid halogen-containing polymeric resin having an intrinsic viscosity of from about 0.25 to 2.5, from about 0.05 to 2 parts by weight per 100 parts by weight of the polyols of polyol-soluble organic stannous salts of carboxylic acids, from about 0.1 to 1 part by weight per 100 parts by weight of the polyols of polyol-soluble organic metal compounds in which the metal is selected from the group consisting of antimony and bismuth and the metal compounds are selected from the group consisting of metal alkoxides and metal salts of carboxylic acids and from about 0.05 to 3.2 parts by weight per 100 parts by weight of component (A) of at least one sterically hindered tertiary amine selected from the group consisting of

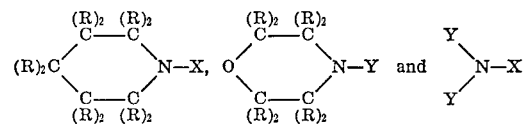

where X is selected from the class consisting of alkyl or alkenyl groups having from 1 to 18 carbon atoms; unsubstituted cycloaliphatic hydrocarbon groups, alkyl substituted cycloaliphatic hydrocarbon groups and cycloaliphatic alkylene hydrocarbon groups, said cycloaliphatic groups having a ring of from 4 to 8 carbon atoms and up to a total of 16 carbon atoms; and unsubstituted aromatic hydrocarbon groups, alkyl substituted aromatic hydrocarbon groups and aromatic alkylene hydrocarbon groups, said aromatic groups containing one benzene ring and from 6 to 16 carbon atoms;

where Y is selected from the class consisting of unsubstituted cycloaliphatic hydrocarbon groups, alkyl substituted cycloaliphatic hydrocarbon groups and cycloaliphatic alkylene hydrocarbon groups, said cycloaliphatic groups having a ring of from 4 to 8 carbon atoms and up to a total of 16 carbon atoms; and unsubstituted aromatic hydrocarbon groups, alkyl substituted aromatic hydrocarbon groups and aromatic alkylene hydrocarbon groups, said aromatic groups containing one benzene ring and from 6 to 16 carbon atoms; and where R is hydrogen or an alkyl group of from 1 to 4 carbon atoms, the maximum number of said alkyl groups being 4.

References Cited

FOREIGN PATENTS 1,333,121   6/1963   France _____ 260—2.5 AB

DONALD E. CZAJA, Primary Examiner

C. W. IVY, Assistant Examiner

U.S. Cl. X.R.

260—2.5 AC, 2.5 BB, 2.5 AJ